United States Patent [19]
Flodin

[11] 3,990,212
[45] Nov. 9, 1976

[54] CARTON FILLING AND WEIGHING DEVICE

[75] Inventor: John F. Flodin, Sunnyside, Wash.

[73] Assignee: Flodin, Inc., Sunnyside, Wash.

[22] Filed: July 17, 1975

[21] Appl. No.: 596,759

[52] U.S. Cl. .............................. 53/59 W; 141/83; 177/229
[51] Int. Cl.² ..................... B65B 57/10; B65B 1/32
[58] Field of Search ............... 53/59 W; 177/47, 48, 177/53, 116, 229; 141/83

[56] References Cited
UNITED STATES PATENTS

| | | | |
|---|---|---|---|
| 3,205,958 | 9/1965 | Thompson et al. | 177/229 X |
| 3,720,039 | 3/1973 | Warkentin | 53/59 W |

*Primary Examiner*—Travis S. McGehee

[57] ABSTRACT

An automatic carton filling and weighing device including a means for automatically assuring that a predetermined weight of product is placed in an empty carton which is continuously provided by a conveyor belt means. The filling and weighing device removes the cartons from the control of the conveyor belt and simultaneously releases the product to fill the carton. Following a short delay after the product has been placed within the carton the carton and its enclosed product are weighed thereby avoiding distortion generated by inertial forces. The weighing device incorporates a flexible cantilever system which accurately reflects the total weight of the carton and its contents regardless of whether the particular loading within the carton is uniform and further avoids problems inherent with the inertial loading forces. Upon the carton reaching the predetermined weight level the carton is returned to control of the conveyor and removed thus releasing the weighing station for the next succeeding carton.

8 Claims, 5 Drawing Figures

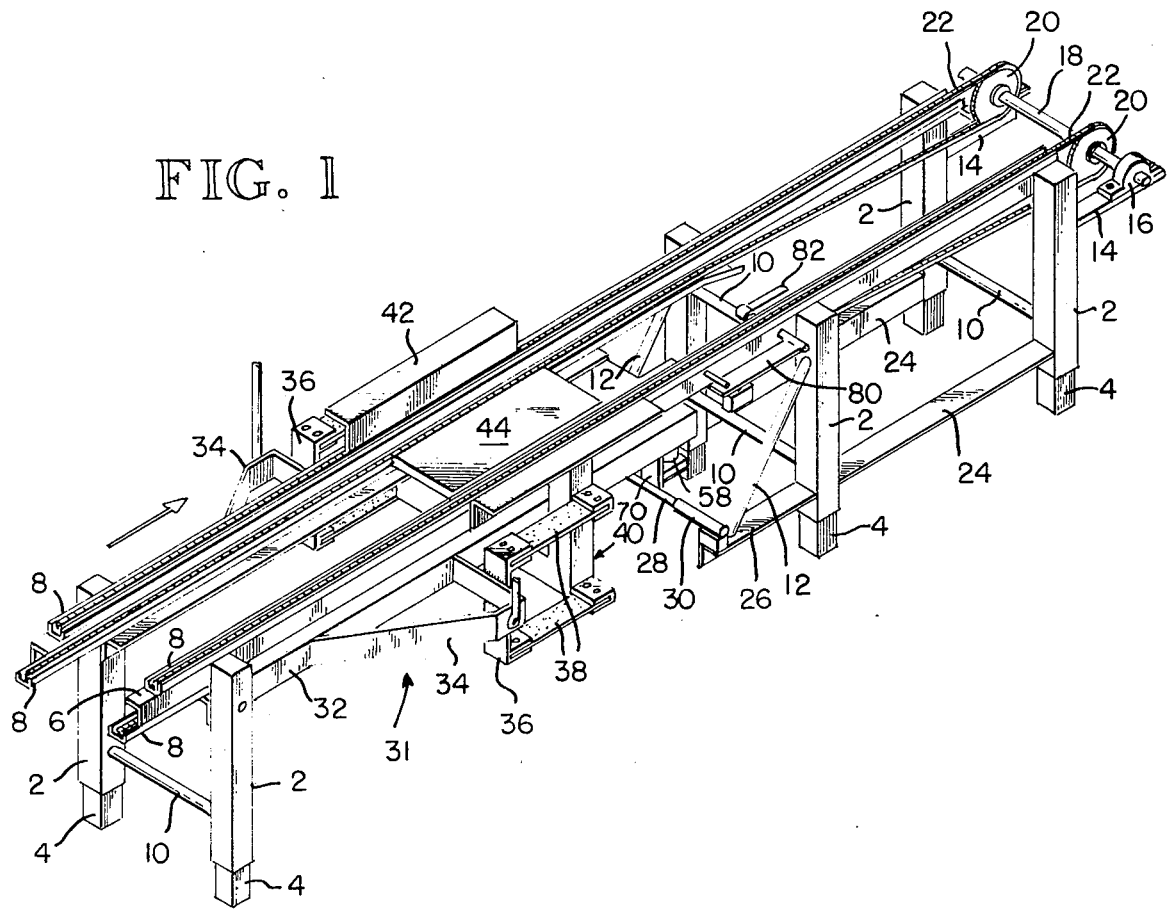
FIG. 1
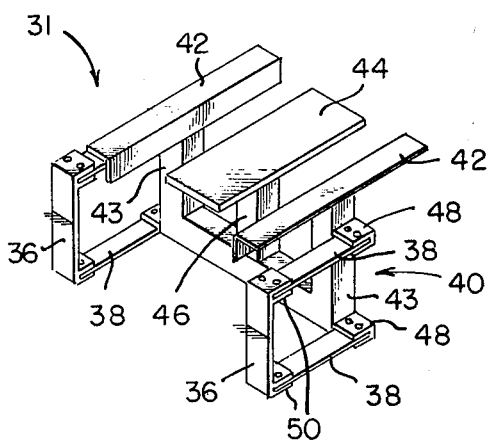
FIG. 2
FIG. 3
```
┌──────────┐   WEIGHT   ┌──────────┐
│    44    │──────────▶│          │
│ PLATFORM │           │ LOAD CELL│
│          │           │ & BRIDGE │
└──────────┘           └──────────┘
  ▲      ▲                  │
RAISE  LOWER               │52
  │      │                  ▼
┌──────────┐           ┌──────────┐
│   AIR    │           │   TIME   │
│ CYLINDER │─58        │  DELAY   │
└──────────┘           └──────────┘
     ▲                      │
     │       ┌──────────┐   │
     └───────│MICROSWITCH│◀──┘
         60─ └──────────┘
```

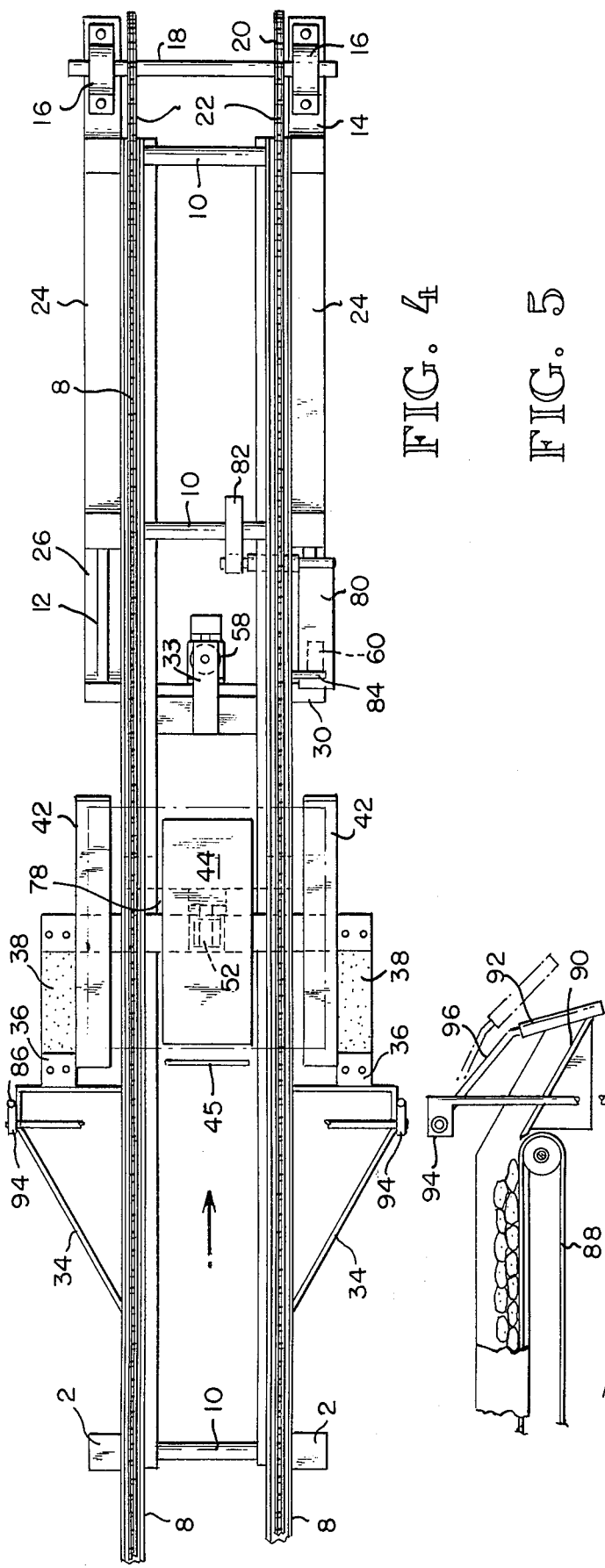
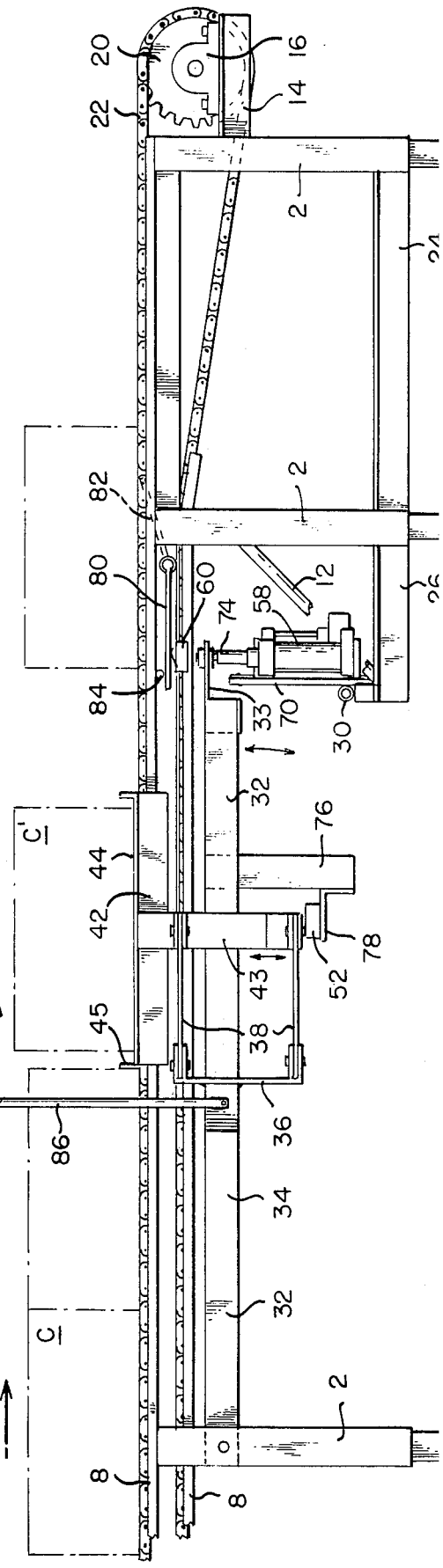
FIG. 4
FIG. 5

CARTON FILLING AND WEIGHING DEVICE

BACKGROUND OF THE INVENTION

With the increasing cost of labor and ever escalating costs of materials it has become more and more imperative that many of the functions which used to be either done completely by hand or at least manually checked, be done as close to totally automatically as possible. One of the areas which has been under increasing pressure to keep costs at a realistic state has been the food processing area. In the food processing area itself one of the particular areas which can be approached and cost savings realised is in the area of food packaging.

Dividing attention to normal, convenience-packaging, both the quantities of the material packaged and the individual elements of the material package are of a small enough unit that minor errors are not particularly costly and further, the control is fairly simple. However, when dealing with bulk quantities or with individual units, to be packaged, which are of a relatively large size, a small error will be multiplied to be a large expense item. Thus, for bulk packaging it is extremely important that the packaging be done as rapidly as possible and as accurately as possible.

Heretofore, bulk items such as potatoes or other produce have been bulk packaged but the weight has had to be continually monitored since the total weight of the packages tends to vary dependent on the particular placement of the item within the package. Further, the jarring generated by inertial forces within the package tends to alter the scale, rendering the total packaged weight unreliable.

With the above known prior art problems in mind it is an object of the present invention to provide an automatic bulk packaging and weighing device wherein the correct amount of the particular product being weighed is automatically parcelled into the container once the container is stopped at the weigh station.

Yet another object of the present invention is to provide a weigh station for bulk packaging wherein the weighing is done electronically including a small time delay between the initial loading and the weighing and the bulk package supporting platform is so fabricated that the particular location of the product within the package does not appreciably affect the total weight factor.

Still another object of the present invention is to provide a bulk packaging means wherein the weighing platform is supported by means of a flexible, cantilever suspension system of a predetermined flexure independent of the product placement within the container. The actual determining factor as to the proper weight is the contact between the suspension system and load cell indicating that the package had reached a predetermined and preset minimal weight without permitting substantial overage.

Yet another object of the present invention is to provide an integrated packaging system wherein the empty cartons are provided by means of a continually moving conveyor belt and the weigh station is constructed such that the carton is removed from the control of the conveyor belt just prior to filling and retained in a position out of control of the conveyor belt until a predetermined weight has been reached. The filled carton is returned to the control of the conveyor belt thus releasing the weight station for the next carton.

Still a further object of the present invention is to provide a novel method and means for packaging bulk articles wherein the packaging and weighing is done in a minimum amount of time and at a maximum accuracy and the weighing system does not respond to inertial forces while being extremely reliable.

BRIEF DESCRIPTION OF DRAWINGS

FIG. 1 is a pictoral representation of the automatic potato packaging and weighing device with parts removed for clarity.

FIG. 2 is an enlarged isometric view of the weighing platform and its support mechanism.

FIG. 3 is a block diagram showing the operational relationship of the elements.

FIG. 4 is a top view of the inventive packaging and weighing device.

FIG. 5 is an elevational view of the inventive packaging and weighing device.

DETAILED DESCRIPTION OF DRAWINGS

As seen in FIG. 1, the inventive packaging and weighing machine comprises a plurality of vertical support memebers 2 having telescopically received therein lower portions 4 such that the length of the vertical members can be adjusted to assure that the entire system including a conveyor will be level. Running the full length of the system including the conveyor is a pair of horizontal parallel angle iron members 6 which interconnect the tops of uprights 2. Mounted to the upper and lower surface of the angle iron 6 are U-shaped chain guide members 8 which retain the conveyor chain in its proper operative position. Lateral support to the structure is provided by cross ling members 10 and angle members 12.

Secured to a pair of the uprights 2 is a horizontally and outwardly extending platform means 14 having secured thereon trunion blocks 16 with support shaft 18 to which are mounted sprocket wheels 20 for conveyor chain 22. Longitudinal members 24 extend between uprights 2 and terminate outwardly thereof as at 26 to which is secured an angular support member 12. Also secured to the extension 26 is a horizontal member 28 received within a holder 30 for reasons to be described hereinafter.

The majority of the remainder of the structure as seen in FIG. 1 comprises the weigh station 31 which includes a pair of elongated substantially horizontal members 32 pivotally mounted to the uprights 2 and extending forwardly to a position overlying the horizontal shaft member 28. Secured to the outer edges of support member 32 are bracket members 34 which in turn have secured thereto vertical elements 36 to which as will be explained in greater detail hereinafter, are secured the flexible cantilever members 38. The opposite end of cantilevers 38 has secured thereto a W-shaped member 40 which as best seen in FIG. 2 supports safety and shielding members 42 on its outer legs 43 and weighing platform 44 on its central leg 46. As seen in this view, the horizontal cantilever elements 35 are sandwiched between horizontal bracket members 48 secured to the upright legs of the element 40 and similar opposing brackets 50 which are secured to the ends of vertical elements 36.

FIG. 3 is a block type flow diagram of the control and operational function. Since the cycle is automatically repetitive, the schematic is shown as recycling. Obviously, a master control switch is utilized even though not specifically shown. The conveyor chain 22 is continually driven and in operation, an empty carton is lifted from the chain by the scale platform 44 which has been elevated by air cylinder 58, actuated by solenoid switch 60. As will be explained hereinafter, the raising of the scale platform 44 simultaneously allows product to be supplied to the empty carton. As the carton fills the flexible members 38 (FIG. 2) are bent contacting load cell 52 which is a part of standard bridge circuit. It is important to note at this point that since the bulk packaging is done at a rapid rate, the initial discharge from the supply source to contact the container generates an inertial force distorting the weighing aspect. To eliminate the inaccuracy, a time delay is electronically included in the circuit such that the load cell is not effective until some time following the inertial shock. The predetermined weight within the carton actuates the load cell circuit, venting the air cylinders (58), lowering the platform (44) and filled carton while terminating product flow. The filled carton is thus moved by the conveyor from the platform and as it moves, actuates solenoid switch 50 again raising the platform and beginning product flow. It is to be understood that time delays are included within the operation to avoid damage or premature response caused by the inertial force generated by first falling product.

Reference is now had to FIGS. 4 and 5 which more clearly place the various elements in operational position. As can readily be seen the main conveyor is supported as noted above by vertical members 2, interlocked by horizontal members 24, 32 and 10. As can best be seen in FIG. 5, a continuous supply of cartons of C is fed to the weighing station whereat they are stopped by upwardly extending lip 45 until the entire weigh station is lowered to its carton receiving position. The raising and lowering as described hereinabove is controlled by pneumatic rams 58 which is mounted upon a plate 70 in turn pivotally mounted at 72 and outwardly extending platform 64. The particular location and mounting of the ram 58 permits it to always react in a normal position against the weighing station. Further, it is to be noted in FIGS. 4 and 5 the main weigh station supporting elements 42 have an extending plate 33 to which is secured the rod 74 of ram 58. Also to be seen in FIG. 5 is the support for the load cell 52.

A downwardly extending vertical element 76 is secured to the pivotable horizontal element 32 and has mounted thereupon a platform 78 which in turn supports the load cell in a position beneath the W-shaped member 40. The W-shaped member 40 supports the platform 44 and is in turn supported by cantilever and flexible members 38 such that when the carton C' is adequately filled the load cell responds venting the ram and allowing the weighing platform to return to its lowered position at which point the filled carton C' is moved out of the weigh station.

The micro-switch 60 is actuated and the ram released by means of a filled passing carton reacting with pivotally mounted actuating levers 80 and 82. It is to be noted that there is a stop 84 preventing lever 80 from being raised to a position whereat it would impede the travel of the filled carton.

A vertical rod 86 is secured to the main pivotal support 32 for the weigh station and extends upwardly to a position adjacent the end of a material supply conveyor 88 which includes an outwardly and downwardly extending lip portion 90 controlled by gate member 92.

The upwardly extending rod 86 is secured by means of an eccentric 94 to the arm 96 which controls the gate. Thus, when the weighing platform is in its raised or material receiving position the gate is open. Once the desired weight has been reached within the carton the load cell is actuated lowering the platform and simultaneously closing the gate.

Thus as can be seen, the present invention provides a simple, economical, compact means for automatically filling and weighing cartons of bulk material such as potatoes or the like. The particular location and timing of the mechanism permits the weighing to be extremely accurate and to be such that the uneven loading of the cartons or the initial impact generated by the intertial forces of the product being dropped into the carton do not effect the accuracy of the weighing.

The fact that the carton reaches a predetermined weight, returns the carton to the control of the conveyor moving it out of the way and enabling an empty carton to replace it while simultaneously closing the gate and eliminating further distribution of the product. The proper positioning of an empty carton beneath the discharge outlet of the product providing means is automatic and the raising of the platform simultaneously opens the gate and allows the product to fill the carton. This completely automatic and accurate system permits cartons to be rapidly and accurately filled with a minimum amount of human monitoring.

What is claimed is:
1. A carton filling mechanism comprising:
 a. frame means,
 b. conveyor means for providing empty cartons to the filling station and moving the filled cartons from the filling station,
 c. product supply means having a discharge means to provide material to the carton filling station on demand, and
 d. carton weighing means pivotally attached to the frame means and including a weighing platform adjacent the discharge means, means to raise the weighing platform and a supported empty carton above the conveyor means, retain it in the raised position during the filling and weighing of the carton and then lowering the platform to a position whereat the conveyor removes the filled carton leaving space for the next carton to be filled.
2. An automatic carton filling mechanism comprising:
 a. framework means,
 b. means secured to the framework means for supplying the product to be placed in the cartons on demand, said means including a discharge means,
 c. conveyor means secured to the framework means to supply empty cartons and to remove filled cartons, and
 d. weighing means secured to the framework means adjacent the discharge means of the product supply means, said weighing means including means to impede the progress of an empty carton, means to remove the empty carton from the control of the conveyor means, means to actuate the discharge means filling the carton, means to replace the carton to the control of the conveyor means upon the contents reaching a predetermined weight whereby a continual stream of containers may be automatically and continuously filled to a predetermined weight.

3. An automatic carton filler as in claim 2 wherein the weighing means comprises a rigid structure supporting the scale, pivotally secured to the framework, said rigid structure movable from a carton receiving discharge position to a weighing position.

4. An automatic carton filling mechanism as in claim 3 wherein the scale comprises an object supporting platform supported by a plurality of flexible strap means, and means responsive to the flexure of the strap means to indicate a predetermined weight upon the platform whereby a particular concentration of weight upon the platform will not effect the reliability of the scale.

5. A scale for rapidly and accurately weighing a predetermined amount of material loaded directly onto the scale, comprising:
   a. means providing the material to the scale,
   b. platform means to receive the material and support it during weighing,
   c. flexible strap means having a first end secured to the frame means and a second end supporting the platform means whereby weight loaded onto the platform means causes flexure of the strap, and
   d. detection means mounted to the frame means adjacent the platform means whereby a weight upon the platform means causes flexure of the straps which is registered by the detecting means following a time delay of sufficient magnitude to obviate errors introduced by the inertia of the material being loaded onto the platform means.

6. A scale as in claim 5 wherein the detection means includes a load cell within a circuit responsive to the deflection of its strap means following the time delay.

7. A scale as in claim 5 wherein the detection means is interconnected with a means automatically supplying material whereby the initial weighing is done following the loading of a first batch of material and an insufficient weight detected at the scale will automatically provide more material to the scale platform.

8. A scale as in claim 5 wherein the scale is incorporated within an automated box filling apparatus including a continuously moving belt which supplies empty containers to the platform and removes accurately filled ones therefrom and means to automatically supply the material to fill the containers, said material entering the container by gravitational force thereby necessitating the time delay to eliminate inaccuracies generated by the inertia of the material.

* * * * *